United States Patent
Kuehne

(10) Patent No.: US 11,262,963 B2
(45) Date of Patent: Mar. 1, 2022

(54) METHOD FOR OPERATING AT LEAST ONE PAIR OF ELECTRONIC AUGMENTED REALITY GLASSES IN A MOTOR VEHICLE, AND DISPLAY DEVICE FOR A MOTOR VEHICLE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 34 days.

(21) Appl. No.: 16/966,622

(22) PCT Filed: Sep. 7, 2018

(86) PCT No.: PCT/EP2018/074168
§ 371 (c)(1),
(2) Date: Jul. 31, 2020

(87) PCT Pub. No.: WO2019/149389
PCT Pub. Date: Aug. 8, 2019

(65) Prior Publication Data
US 2021/0034314 A1    Feb. 4, 2021

(30) Foreign Application Priority Data

Feb. 1, 2018    (DE) ...................... 10 2018 201 523.6

(51) Int. Cl.
*G06F 3/14* (2006.01)
*A63F 13/216* (2014.01)
*G01C 21/36* (2006.01)

(52) U.S. Cl.
CPC .............. *G06F 3/14* (2013.01); *A63F 13/216* (2014.09); *G01C 21/3697* (2013.01)

(58) Field of Classification Search
None
See application file for complete search history.

(56) References Cited

U.S. PATENT DOCUMENTS

2017/0361933 A1    12/2017    Van Der Klooster et al.

FOREIGN PATENT DOCUMENTS

| CN | 104554095 A | 4/2015 |
|---|---|---|
| CN | 107021014 A | 8/2017 |
| CN | 107167147 A | 9/2017 |
| DE | 101 56 219 C1 | 8/2003 |
| DE | 10 2014 011 278 A1 | 1/2015 |
| DE | 10 2014 219 223 A1 | 4/2015 |
| DE | 10 2014 220 001 A1 | 4/2015 |
| DE | 10 2014 221 337 A1 | 4/2015 |

(Continued)

OTHER PUBLICATIONS

International Search Report dated Nov. 14, 2018 from International Application No. PCT/EP2018/074168, 5 pages.

(Continued)

*Primary Examiner* — Aneeta Yodichkas
(74) *Attorney, Agent, or Firm* — Staas & Halsey, LLP

(57) ABSTRACT

Multiple different entertainment offerings are made available to a user can be played back via at least one pair of electronic data glasses in a motor vehicle. The system analyzes how well the route characteristics of an upcoming route to a destination and/or how well the respective route characteristics of a road network in the vicinity of the motor vehicle match the entertainment offerings provided. The entertainment offerings are varied depending on the analysis.

10 Claims, 1 Drawing Sheet

(56) References Cited

FOREIGN PATENT DOCUMENTS

| DE | 10 2014 019 579 A1 | 6/2016 |
| DE | 10 2015 003 948 A1 | 9/2016 |
| EP | 3 079 041 A1 | 10/2016 |

OTHER PUBLICATIONS

"Use advanced search in Video Manager—YouTube Help" on support.google.com/youtube/answer/2685977?hl=en, dated Sep. 20, 2015 at web.archive.org/web/20150920014816; printed Jul. 29, 2020; 4 pp.
DE 10 2018 201 523.6, Feb. 1, 2018, Marcus Kuehne, Audi, AG.
PCT/EP2018/074168, Sep. 7, 2018, Marcus Kuehne, Audi AG.
English translation by WIPO of International Preliminary Report on Patentability dated Jun. 15, 2020 for International Application No. PCT/EP2018/074168, 9 pages.
Chinese Office Action dated Oct. 9, 2021 from Chinse Application No. 201880088187.1.

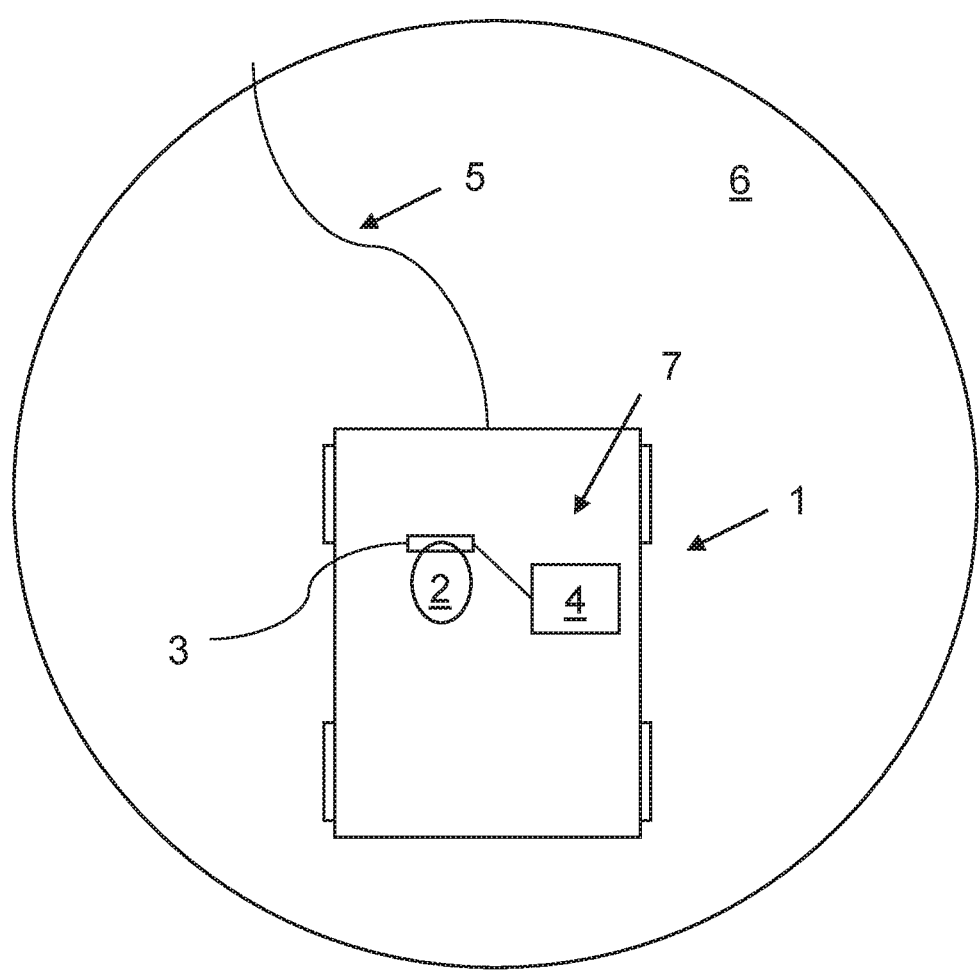

METHOD FOR OPERATING AT LEAST ONE PAIR OF ELECTRONIC AUGMENTED REALITY GLASSES IN A MOTOR VEHICLE, AND DISPLAY DEVICE FOR A MOTOR VEHICLE

CROSS REFERENCE TO RELATED APPLICATIONS

This application is a U.S. national stage of International Application No. PCT/EP2018/074168, filed on Sep. 7, 2018. The International Application claims the priority benefit of German Application No. 10 2018 201 523.6 filed on Feb. 1, 2018. Both the International Application and the German Application are incorporated by reference herein in their entirety.

BACKGROUND

Described below are a method for operating at least one pair of electronic data glasses in a motor vehicle and a display device for a motor vehicle, as well as a motor vehicle with such a display device.

The entertainment of vehicle occupants, in particular by various media content, will take on an ever-increasing importance due, among other things, to the very likely future spread of autonomous vehicles. There are already many approaches to the entertainment of occupants.

For example, DE 10 2014 011 278 A1 reveals a method for bridging a period during autonomous driving of a motor vehicle. A driver of the motor vehicle may play a computer game during an autonomous journey, wherein, inter alia, a steering wheel, an accelerator pedal, and a brake of the motor vehicle can be used as input elements for the computer game.

DE 10 2014 219 223 A1 reveals an autonomous motor vehicle with an entertainment system. Using the entertainment system, media content for vehicle occupants can be projected onto a projection surface.

DE 10 2014 220 001 A1 reveals a method in which media content is played back during an autonomous driving mode of a motor vehicle. If the autonomous driving mode is interrupted, the playback of the media content is also aborted.

SUMMARY

Described below is a system by which particularly realistic-looking entertainment offerings can be played back by at least one pair of electronic data glasses in a motor vehicle.

With the method for operating at least one pair of electronic data glasses in a motor vehicle, multiple different entertainment offerings, which can be played back by the electronic data glasses, are provided. The entertainment offerings can be, for example, virtual experiences, in which one moves in a context matching the driving movement of the motor vehicle. For example, one can fly virtually over a planetary surface. If the motor vehicle is travelling round a bend, this movement is also played back in the displayed virtual world, i.e. during the flight over the planetary surface, so that the real forces acting on the wearer of the electronic data glasses coincide with the virtual experience. In the same way, the entertainment offerings may also include films or the like.

The method is based on the realization that these different entertainment offerings or entertainment formats function sometimes better and sometimes worse with different route characteristics. For example, a virtual space battle on a winding mountain route will be more natural or authentic than on a long and flat motorway. If, on the other hand, one wants to watch a movie in a virtual cinema by the electronic data glasses, an elongated gently winding and flat route would be advantageous where possible.

With the method, provision is therefore made for analyzing how well the route characteristics of an upcoming route to a destination and/or how well the respective route characteristics of a road network in the vicinity of the motor vehicle match the entertainment offerings provided. For an upcoming route, or if this were not to be known, entertainment offerings suitable for a surrounding transport network characteristic can thus be filtered out and offered particularly well. The route characteristics are to be understood in particular to mean how winding and hilly a certain route or road network is.

Once the analysis has been carried out as to how well the route characteristics of the upcoming route to a destination and/or how well the respective route characteristics of the road network concerned in the vicinity of the motor vehicle match the entertainment offerings provided, the entertainment offerings will be offered depending on the analysis for playback with the electronic data glasses.

For example, the electronic data glasses may be connected directly, or the motor vehicle may even be connected to an in-vehicle or external navigation system. In this way, it is possible to analyze the route characteristics of the upcoming route and/or the respective route characteristics of the road network in the vicinity of the motor vehicle and to compare them with the entertainment offered. If, for example, it can be seen from the analysis that the motor vehicle will travel on a very winding and hilly route in order to reach a certain destination, then the entertainment offerings for which particularly strong up and down and sideways movements would be advantageous would be considered to be a particularly good match. If, on the other hand, it is found that the upcoming route is along a very flat surface and also has very few bends, for example, those entertainment offerings for which fewer up and down movements and fewer sideways movements would be advantageous are considered a particularly good match.

The user of the electronic data glasses is presented with the analysis result either directly by the electronic data glasses, more precisely by a corresponding display the electronic data glasses, or, if the electronic data glasses are not being worn, for example, via a vehicle-side display device, by displaying the entertainment offerings accordingly depending on the analysis. The user of the electronic data glasses can therefore clearly see how well the various available entertainment offerings match the route planned by them and/or a navigation system before they drive along their route to the destination and/or drives along a route along the road network in the vicinity of the motor vehicle. As a result, the user of the electronic data glasses can choose the entertainment offerings or the entertainment offering that best matches the route characteristics. This gives a particularly realistic perception of the entertainment offerings concerned when wearing the electronic data glasses in a motor vehicle, since the stimuli perceived with the eyes and the sense of balance are very well matched. This, in addition to the pure enjoyment of the entertainment offerings, that seem particularly realistic as a result, can also prevent the wearer of the electronic data glasses from becoming ill. This is because the method described also prevents so-called simulator and motion sickness.

An advantageous embodiment provides that the entertainment offerings are offered by indicating a given result of the analysis associated with the offered forms of entertainment. For example, a rating score or the like can be displayed next to the respective entertainment offerings provided. In this way, the user of the electronic data glasses can easily recognize the result of the analysis and, if they wish, select the best rated or best analyzed entertainment offering, for example.

A further advantageous embodiment provides that the entertainment offerings are offered by displaying the entertainment offerings sorted in an order according to their respective analysis results, e.g., in descending order starting from the best analysis result. In this way, the user of the electronic data glasses can recognize in a particularly simple way which of the offered entertainment offerings best suits the route ahead. It is also possible per se that, following the analysis of how well the route characteristics of the upcoming route to the destination and/or how well the respective route characteristics of the road network in the vicinity of the motor vehicle match the entertainment offered, those entertainment offerings are filtered out and not offered at all for which it is clear on the basis of the analysis result that the correspondence between the respective entertainment offerings and the respective route characteristics is so poor that this would lead to a bad user experience. In this context, it is also possible that the user of the electronic data glasses can choose whether they want to have this filter function or instead prefers to be shown all the entertainment offerings that are possible in principle.

In a further advantageous embodiment, it is provided that a time to the destination is determined and the entertainment offerings are offered for playback with the electronic data glasses depending on the determined time. If, for example, on the basis of the user input it is clear that they will only be driving for 15 to 20 minutes, for example, they can be shown or offered primarily or in general correspondingly short entertainment formats or offers, for example. If, on the other hand, it is clear that the user will be driving a very long distance, for example will be on the road for two or more hours, then entertainment offerings which will last an equally long time can also be displayed for selection by the user. Therefore, with the knowledge of the time to the destination, for example, those entertainment offerings which are particularly suitable in terms of their length of performance can be pre-filtered, since they have a particularly good match to the time to the destination.

According to a further advantageous embodiment, provision is made for the time for which a user of the electronic data glasses wants to be entertained to be queried, and the entertainment offerings are offered for playback by the electronic data glasses depending on a specified entertainment duration. For example, it may be that the user of the electronic data glasses has no intention of using the entire travel time for the enjoyment or consumption of entertainment offerings. In this case, it may be particularly advantageous if the user of the electronic data glasses can simply specify how long they want to be entertained for at all, wherein the corresponding entertainment offerings are provided for selection. For example, the user of the electronic data glasses may know that they want to make business calls while travelling, so that they can only use one of the entertainment offerings for the remaining period of time. In such a case, it may be highly advantageous if the entertainment offerings which are offered for selection also match the planned usage time very closely.

In a further advantageous embodiment, it is provided that, if the specified duration of the entertainment is shorter than a driving time in the motor vehicle, a most suitable section of a route being driven is selected for playing back one of the entertainment offerings. At this point, the previously mentioned analysis can then take effect, with which it is determined how well, for example, the route characteristics of the upcoming route to a destination match, in order to then select the most suitable section of the route being driven for playing back one of the entertainment offerings. For example, the section of the route can be selected which is particularly hilly and also has particularly winding route characteristics, if this should match one of the entertainment offerings particularly well. Of course, a converse method is also possible, so that, for example, a section of the route is chosen which has particularly few bends, if this should match one of the entertainment offerings particularly well.

The display device for a motor vehicle described herein includes at least one pair of electronic data glasses for playing back different entertainment offerings as well as a control device, which is designed to provide the entertainment offerings and to assess how well the route characteristics of an upcoming route to a destination and/or how well the respective route characteristics of a road network in the vicinity of the motor vehicle match the entertainment offerings provided, and to offer the entertainment offerings for playback with the electronic data glasses depending on the analysis. The control device may be part of the electronic data glasses or, for example, part of an infotainment system of the motor vehicle. For example, it is possible that the electronic data glasses have a suitable communication interface by which different entertainment offerings can be downloaded, for example from an external server, and thus provided. It is also possible that the motor vehicle has a suitable communications interface by which different entertainment offerings can be downloaded or made available for selection. Advantageous embodiments of this method are to be regarded as advantageous embodiments of the display device and vice versa, wherein the display device implements the method.

An advantageous embodiment of the display device provides that the electronic data glasses are virtual reality glasses or augmented reality glasses. In the former case, the user of the electronic glasses can completely immerse himself in virtual worlds during a journey in the motor vehicle, since the virtual reality glasses visually completely separate them from their real environment. If the electronic data glasses are augmented reality glasses, the user of the electronic glasses can still see the real environment, wherein the augmented reality glasses overlay it with additional virtual content. This overlaying of reality with virtual content then depends on the entertainment offering selected by the user. It is also conceivable that the at least one pair of electronic data glasses is designed to act as both virtual reality glasses and augmented reality glasses and are thus a kind of hybrid.

The motor vehicle described herein includes the display device or an advantageous embodiment of the display device.

Further advantages, features and details arise from the following description of exemplary embodiments as well as on the basis of the drawing. The features and combinations of features mentioned above in the description as well as the features and combinations of features revealed in the description and/or in the FIGURE alone are not only applicable in the respective described combination, but also in other combinations or on their own without departing from the scope of the invention.

BRIEF DESCRIPTION OF THE DRAWINGS

These and other aspects and advantages will become more apparent and more readily appreciated from the following description of the exemplary embodiments, taken in conjunction with the accompanying drawings of which:

The drawing shows in the only FIGURE a highly schematic representation of a motor vehicle, in which a user is sitting wearing electronic data glasses, by which a wide variety of entertainment offerings can be played back while travelling in the motor vehicle.

DETAILED DESCRIPTION

Reference will now be made in detail to the preferred embodiments, examples of which are illustrated in the accompanying drawings, wherein like reference numerals refer to like elements throughout.

A motor vehicle 1 is shown in a highly schematic representation in the single FIGURE. A vehicle occupant 2 who has put on electronic data glasses 3, for example in the form of virtual reality glasses or even in the form of augmented reality glasses, is sitting in the motor vehicle 1.

In addition, a control device 4 is also indicated schematically, and is set up to provide different entertainment offerings and to analyze how well the route characteristics of an upcoming route 5 to a destination and/or how well the respective route characteristics of a road network in the vicinity of the motor vehicle 1 match the entertainment offerings provided, as well as the entertainment offerings offered for playback with the electronic data glasses 2 depending on the analysis.

The control device 4 may, for example, be part of the electronic data glasses 2. It is also possible that the control device 4 is part of an in-vehicle infotainment system of the motor vehicle 1.

For example, if the vehicle occupant 2 is the driver of the motor vehicle 1, they may use the electronic data glasses 3 in particular for entertainment purposes when the motor vehicle 1 is driving fully autonomously. Before starting the journey, or at least before use of the electronic data glasses 3, the occupants of the vehicle 2 are provided by the control device 4 with different entertainment offerings, which can be played back by the electronic data glasses 3. The control device 4 analyses how well the route characteristics of the present route 5 to a given destination match with the entertainment offerings provided. For example, if the occupant 2 has previously entered a specific destination, such as a commute or the like, for example, a navigation system of the motor vehicle 1 which is not shown here can determine the corresponding route 5 to reach the destination and can transmit information about the route characteristics of the route 5 to the control device 4. This can then in turn analyze how well the route characteristics of the upcoming route 5 match different available entertainment offerings, such as virtual computer games, movies, and the like.

In the event that the specific route 5 should not yet be determined at all, it is also possible that the control device 4 analyses how well the respective route characteristics of a road network in the vicinity 6 of the motor vehicle 1 match the provided entertainment offerings. Either way, the entertainment offerings provided are offered for playback with the electronic data glasses 3 depending on the analysis.

Offering entertainment offerings can be carried out, for example, by displaying a respective result of the analysis associated with the offered forms of entertainment. The vehicle occupant 2 can recognize particularly well which of the available entertainment offerings matches the route characteristics of the route 5 particularly well, for example, if the entertainment offerings are shown sorted according to their respective results from the above-mentioned analysis in a very specific order, e.g., in descending order starting from the best analysis result. This display may be carried out, for example, by the electronic data glasses 3 and/or by a display device of the motor vehicle 1, for example by a display in the area of the center console or the like.

The vehicle occupant 2 can thus easily see which of the entertainment offerings available in principle best match the route characteristics of the route 5 still ahead, for example. After the vehicle occupant 2 has selected one of the available and offered entertainment offerings, they can sit back relaxed, for example, while the motor vehicle 1 drives along the route 5 fully autonomously and the vehicle occupant 2 has the entertainment offering they have just selected played back by the electronic data glasses 3.

For example, it is conceivable that the motor vehicle 1 is fully autonomously travelling along a very hilly and winding route 5. Appropriately, the vehicle occupant 2 has been offered the entertainment offering which best suits a particularly winding and hilly route, for example because the entertainment offering is a virtual space battle, in which when wearing electronic data glasses 3 the vehicle occupant 2 performs many virtual up and down movements as well as sideways movements because they are, for example, carrying out the space battle with their virtual space glider. The fact that the route characteristics of the route 5 are particularly well suited to the virtual experience, which is played back by the selected entertainment offering, gives a particularly realistic impression, for example of a computer game in the form of the virtual space battle, when it is played back by the electronic data glasses 3.

In addition, it is also possible that a time to the destination is determined and the entertainment offerings are offered depending on the determined time for playback with the electronic data glasses 3. If, for example, it is clear that the occupant 2 will spend only a few minutes in the motor vehicle 1 until the destination is reached, then those entertainment offerings which do not require a particularly long entertainment time per se may be shown first in a list or at the top.

In addition, it is also possible to ask how long the vehicle occupant 2 would like to be entertained in total, wherein the entertainment offerings are offered for playback with the electronic data glasses 3 according to the specified entertainment time. For example, it is also possible that the occupant 2 of the vehicle knows that they will not be able to use the entire driving time to be entertained by the electronic data glasses 3, for example because they want to do other things, such as making phone calls or the like, while travelling. In this case, it is particularly advantageous to ask how long the occupant 2 wants to be entertained in total by the electronic data glasses 3. Adapted to this query, the other entertainment offerings can then be offered preferentially, for example visually marked or otherwise marked, so that the vehicle occupant 2 does not get disconcerted from the outset into selecting entertainment offerings which are much too long.

In addition, it is also possible that, if the specified duration of the entertainment which is desired by the vehicle occupant 2 is shorter than a specified journey time along the route 5 to a specific destination, a most suitable section of the route 5 is selected for playing back one of the entertainment offerings. Thus, it is for example conceivable, for example on a longer journey, that the route 5 initially runs along a motorway, for example, which has fewer bends and a very flat profile, whereas during a middle section of the route 5, for example, a mountain pass is crossed which includes a winding route. If, for example, a very specific entertainment offering matches particularly well on this winding route, the electronic data glasses 3 are controlled in such a way that the appropriate entertainment offering is played back as soon as the winding route begins.

The electronic data glasses 2 and the control device 4 form a display device 7 for the motor vehicle 1. By this display device 7, it is possible in the explained manner to offer the entertainment offerings which are specially suitable for certain route characteristics and which can be played back by the electronic data glasses 3 to the vehicle occupant 2, prepared so that the vehicle occupant 2 can directly determine which of the available entertainment offerings per se particularly well matches the respective route characteristics of yet to be travelled routes 5. As a result, both virtual and augmented content can be played back particularly realistically during the journey in the motor vehicle 1.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating at least one pair of electronic data glasses in a motor vehicle, comprising:
    providing multiple different entertainment offerings, available to play back using the electronic data glasses;
    connecting at least one of the motor vehicle to an external navigation device and the at least one pair of electronic data glasses directly to at least one of an in-vehicle navigation device and the external navigation device;
    analyzing at least one of how well route characteristics of an upcoming route to a destination and how well respective route characteristics of a road network in a region around the vehicle, match the entertainment offerings available;
    querying how long a user of one pair of the electronic glasses would like to be entertained to obtain a specified entertainment duration;
    selecting, when the specified entertainment duration is shorter than a time of travelling in the motor vehicle, a section of a route being travelled which is most appropriate with respect to the route characteristics for playing back at least one of the entertainment offerings, where the entertainment offerings are virtual experiences in which the user moves in a context matching driving movement of the motor vehicle, so that real forces acting on the user of the one pair of the electronic data glasses match the virtual experiences of the at least one of the entertainment offerings selected; and
    offering the at least one of the entertainment offerings based on the analyzing and the specified entertainment duration.

2. the method according to claim 1, wherein the offering of the at least one of the entertainment offerings includes displaying a respective result of the analyzing for each of the at least one of the entertainment offerings.

3. The method according to claim 2, wherein the offering of the at least one of the entertainment offerings includes displaying the at least two of the entertainment offerings sorted according to the respective result in descending order starting from a best analysis result.

4. The method according to claim 3,
    further comprising determining a time to the destination, and
    wherein the offering of the at least one of the entertainment offerings depends on the time to the destination.

5. The method according to claim 1, wherein the offering of the at least one of the entertainment offerings includes displaying the at least two of the entertainment offerings sorted according to the respective result in descending order starting from a best analysis result.

6. The method according to claim 1,
    further comprising determining a time to the destination, and
    wherein the offering of the at least one of the entertainment offerings depends on the time to the destination.

7. A display device for a motor vehicle having at least one of an in-vehicle navigation device and a connection to an external navigation device, comprising
    at least one pair of electronic data glasses for playing back entertainment offerings; and
    a control device, connected to the at least one pair of electronic data glasses and configured to
    connect at least one of the motor vehicle to the external navigation device and the at least one pair of electronic data glasses directly to at least one of the in-vehicle navigation device and the external navigation device,
    provide the entertainment offerings to the at least one pair of electronic data glasses,
    analyze at least one of how well the route characteristics of an upcoming route to a destination and how well respective route characteristics of a road network in a region around the motor vehicle, match the entertainment offerings available,
    query how long a user of one pair of the electronic data glasses wants to be entertained to obtain a specified entertainment duration,
    select, when the specified entertainment duration is shorter than a travelling time with the motor vehicle, a section of a route being travelled which is most appropriate in terms of route characteristics for playing back at least one of the entertainment offerings, where the entertainment offerings are virtual experiences in which the user moves in a context matching a driving motion of the motor vehicle, so that real forces acting on the user of the one pair of the electronic data glasses match the virtual experience, and
    offer the at least one of the entertainment offerings based on the analyzing and the specified entertainment duration.

8. The display device according to claim 7, wherein the electronic data glasses are one of virtual reality glasses and augmented reality glasses.

9. A motor vehicle, comprising:
    at least one of an in-vehicle navigation device and a communication device communicating with an external navigation device; and
    a display device, including
        at least one pair of electronic data glasses for playing back entertainment offerings; and
        a control device, connected to the at least one pair of electronic data glasses and configured to:
            connect at least one of the motor vehicle to the external navigation device and the at least one pair of electronic data glasses directly to at least one of the in-vehicle navigation device and the external navigation device, provide the entertainment offerings to the at least one pair of electronic data glasses, analyze at least one of how well the route characteristics of an upcoming route to a destination and how well respective route characteristics of a road network in a region around the motor vehicle, match the entertainment offerings available, query how long a user of one pair of the electronic data glasses wants to be entertained to obtain a specified entertainment duration, select, when the specified entertainment duration is shorter than a travelling time with the motor vehicle, a section of a route being travelled which is most appropriate in terms of route characteristics for playing back at least one of the entertainment offerings, where the entertainment offerings are virtual experiences in which the user moves in a context matching a driving motion of the motor vehicle, so that real forces acting on the user of the one pair of the electronic data glasses match the virtual experience, and offer the at least one of the entertainment offerings based on the analyzing and the specified entertainment duration.

10. The motor vehicle according to claim 9, wherein the electronic data glasses are one of virtual reality glasses and augmented reality glasses.

\* \* \* \* \*